United States Patent [19]

Nakajima

[11] Patent Number: 4,688,551

[45] Date of Patent: Aug. 25, 1987

[54] HEAT PROCESSING DEVICE USING A LIQUEFIED GAS

[75] Inventor: Masahiko Nakajima, Tokyo, Japan

[73] Assignee: Nakajima Dokosho Company Limited, Tokyo, Japan

[21] Appl. No.: 866,703

[22] Filed: May 27, 1986

[30] Foreign Application Priority Data

May 25, 1985 [JP] Japan ................................. 60-112763

[51] Int. Cl.⁴ ............................................. B23K 3/02
[52] U.S. Cl. .................................. 126/414; 126/404; 126/407
[58] Field of Search ...................... 431/344, 345, 355; 126/403, 406, 237, 231, 232, 233, 408, 404, 407, 413, 414, 229

[56] References Cited

U.S. PATENT DOCUMENTS

| | | | |
|---|---|---|---|
| 729,346 | 5/1903 | Huff | 126/233 |
| 976,112 | 11/1910 | Zarembowitz | 431/355 X |
| 1,134,165 | 4/1915 | Stichler | 126/413 |
| 3,301,306 | 1/1967 | Finley et al. | 431/355 X |
| 4,119,088 | 10/1978 | Sim | 126/238 X |
| 4,419,072 | 12/1983 | Nakagawa et al. | 431/355 X |
| 4,502,465 | 3/1985 | Yoshinaga et al. | 431/344 X |

Primary Examiner—Carroll B. Dority, Jr.
Attorney, Agent, or Firm—Cushman, Darby & Cushman

[57] ABSTRACT

A heat processing device using a liquefied gas comprises a nozzle for jetting a liquefied gas, a gas mixture generating member disposed at the exit of the nozzle for sucking external air through an external air intake port under the ejector effect of the gas jetted out from the nozzle to form a gas mixture, a fire nozzle member for jetting out the thus formed gas mixture to take place flaming combustion, and an air flow control member for controlling the flow rate of air flowing through the air intake port into the gas mixture generating member. The heat processing device further comprises an iron tip member having a combustion catalyst detachably disposed near the top end of the fire nozzle, in which the air intake port in the fully opened state is once closed fully and then fully opened again by the operation of the air flow rate control member interlocking with the operation of the shutter member for closing/opening the space between the fire nozzle and the combustion catalyst.

5 Claims, 6 Drawing Figures

HEAT PROCESSING DEVICE USING A LIQUEFIED GAS

BACKGROUND OF THE INVENTION

1. Field of the Invention

This invention concerns a heat processing device using butane or like other liquefied gas as a fuel and, more specifically, it relates to a heat processing device using a liquefied gas capable of controlling the flow rate of air to be mixed with the fuel gas.

2. Description of the Prior Art

There have generally been known various types of heat processing devices, for example, a traditional blow or torch lamp in which a gas mixture composed of liquefied gas and air is jetted out from a fire nozzle member, followed by ignition, as well as a soldering iron, for example, disclosed by Sim in U.S. Pat. No. 4,119,088. There has further been known an improved catalytic combustion type soldering iron in which the gas mixture is put to flameless complete combustion in contact with the combustion catalyst and an iron tip is heated by the heat of the catalytic combustion as disclosed in Japanese Patent Publications Nos. 6033/1980 and 29789/1980.

However, the conventional heat processing devices of these types were restricted respectively in their application uses and those devices capable of serving both for a blow or torch lamp and a soldering iron were not known.

In view of the above, the present inventor has already proposed a heat processing device capable of serving both for the soldering iron and the blow or torch lamp of the catalytic combustion type as disclosed in our Japanese Patent Application No. 159850/1984, as well as in our U.S. Pat. No. 4,552,124.

In our prior application and prior patent, the heat processing device can be used as a soldering iron by igniting a gas mixture composed of liquefied gas and air jetted out from a fire nozzle member, heating the combustion catalyst by the heat of the ignition flame to a temperature capable of complete combustion by the catalytic oxidation and then extinguishing the pilot flame at the fire nozzle member by closing the air port or space formed between the iron tip member and the fire nozzle member by a shutter, or by displacing the iron tip member and the fire nozzle member axially relative to each other thereby closing the space between them. This heat processing device can also be used as a blow lamp by detaching the iron tip member. It can further be used as a torch by closing the external air intake port under the state where the device is used as the blow lamp while using the flame from the fire nozzle member as a flame like that in a gas lighter.

By the way, in the case of using the heat processing device of this type as a blow lamp, it is desirable to adjust the temperature at the top end of the flame depending on the kinds of materials to be fabricated, the way of fabrication, etc. However, temperature change can not be attained with ease unless the gas flow rate is controlled to change the size of the flame and, further, it is difficult to obtain a desired temperature even if the gas flow rate is thus controlled.

Sim discloses in his U.S. Patent as cited above, a mechanism for controlling the temperature of the gas flame by regulating the open area of main air intake holes, etc., thereby varying the air flow entering the air intakes. However, mere regulation for the entering air flow is not practically suitable to the application use as the hot blow, where strict and accurate temperature control is required, for example, each by 100° C. step depending on the works. Blow lamp users would encounter a difficulty upon using the Nigel's control mechanism, because they have to judge the temperature change, for example, by the color of the gas flame. Such a measure is too rough to determine the exact temperature of the blow flame, although it may be effective for the temperature control of the iron bit as in Sim.

In addition, his soldering iron does not use the principle of the catalytic combustion that was developed by us for the complete flameless and safety combustion.

In the case of using the neat processing device as a soldering iron by disposing an iron tip to the top end of the fire nozzle member, if the scale of the device is enlarged in order to obtain an increased thermal power, it takes a considerable time to extinguish the pilot flame at the fire nozzle member and there is even a possibility that the flame can not be put off even if the space between the iron tip and the fire nozzle member is shut. It is essential in the catalytic combustion type soldering iron to extinguish the pilot flame without fail at least in the stage of actual soldering work as stated in our U.S. Patent.

SUMMARY OF THE INVENTION

This invention has been made in view of the foregoing situations and, accordingly, it is the first object of this invention to provide a heat processing device using a liquefied gas in which the temperature at the top end of the flame can be controlled easily and exactly depending on works.

The secondary object of this invention is to provide a heat processing device using a liquefied gas that enables to rapidly and reliably extinguish the pilot flame at the fire nozzle member under any condition upon using the device as the soldering iron.

The foregoing first object can be attained in accordance with this invention by a heat processing device using a liquefied gas comprising:

a nozzle for jetting out a liquefied gas from a gas reservoir as a fuel gas, a cylindrical gas mixture generating member disposed at the exit of the nozzle and supplied with the fuel gas jetted out from the nozzle, an external air intake port formed by perforating the circumferential wall of the gas mixture generating means for sucking external air under the ejector effect of the fuel gas jetted out from the nozzle to form a gas mixture, a fire nozzle member for jetting out the gas mixture supplied from the gas generating member to take place flaming combustion, an air flow control member disposed to the outer circumference of the gas mixture generating member slidably along the axial or circumferential direction for controlling the flow rate of air flowing into the gas mixture generating member, and a guiding graduation member composed of a plurality of graduations situated along the sliding path of the air flow control member for indicating the position of a predetermined portion of the air flow control member as the control member is displaced along the graduations, thereby enabling to control the open area of the external air intake port over a plurality of steps from the fully opened state to the fully closed state.

The secondary object of this invention can be attained in accordance with this invention by a heat processing device using a liquefied gas comprising:

a nozzle for jetting out a liquefied gas from a gas reservoir as a fuel gas, a cylindrical gas mixture generating member disposed at the exit of the nozzle and supplied with the fuel gas jetted out from the nozzle, an external air intake port formed by perforating the circumferential wall of the gas mixture generating means for sucking external air under the ejector effect of the fuel gas jetted out from the nozzle to form a gas mixture, a fire nozzle member for jetting out the gas mixture supplied from the gas generating member to take place flaming combustion, an iron tip member disposed on the side of the top end of the fire nozzle member and having incorporated therein a combustion catalyst for the complete combustion of the gas mixture by the oxdizing reaction, and an air flow control member disposed to the outer circumference of the gas mixture generating member slidably along the axial or circumferential direction so as to once fully close the external air intake port in the fully opened state and then again fully open the port in the course of the sliding movement, thereby extinguishing the flame at the fire nozzle member and supplying the gas mixture as it is directly to the iron tip member.

In accordance with the first feature of this invention, since the open area of the external air intake port of the gas mixture generating member is adjusted by the air flow control member thereby controlling the flow rate of air flowing into the gas mixture generating member, the temperature at the top end of the flame can be easily and exactly be adjusted with no change in the size of the flame upon using the device as the blow lamp. Further, since the graduations are situated along the sliding path of the air flow control member, the air intake rate and, accordingly, the corresponding temperature of the flame can be read as the physical displacement of a predetermined portion of the control member easily and accurately indicated by the graduations, by which the temperature control of the gas flame can be performed at a high accuracy. Moreover, the device can be used also as a torch by fully closing the external air intake port.

In accordance with the second feature of this invention, since the external air intake port under the fully opened state is once closed fully and than opened fully again by the air flow control member, the pilot flame at the fire nozzle member can be extinguished rapidly and reliably after the start of the catalytic combustion, when it is used as the soldering iron.

BRIEF DESCRIPTION OF THE ACCOMPANYING DRAWINGS

These and other objects, features, as well as advantageous effects of this invention will be made clearer by reading the following descriptions for the preferred embodiments thereof while referring to the accompanying drawings, wherein FIG. 1 is a cross sectional view for a heat processing device according to this invention when it is used as a soldering iron, FIG. 2 is a detailed view for a portion of the heat processing device according to this invention when it is used as a blow or torch lamp, FIG. 3 is an explanatory view showing the fire nozzle member from the left in FIG. 1, FIG. 4 is an enlarged cross sectional view showing the combustion catalyst taken along line IV—IV in FIG. 1, FIG. 5 is a cross sectional view for a portion of another embodiment according to this invention, and FIG. 6 is an enlarged cross sectional view taken along line VI—VI in FIG. 5.

DESCRIPTION OF THE PREFERRED EMBODIMENTS

Figure 1:
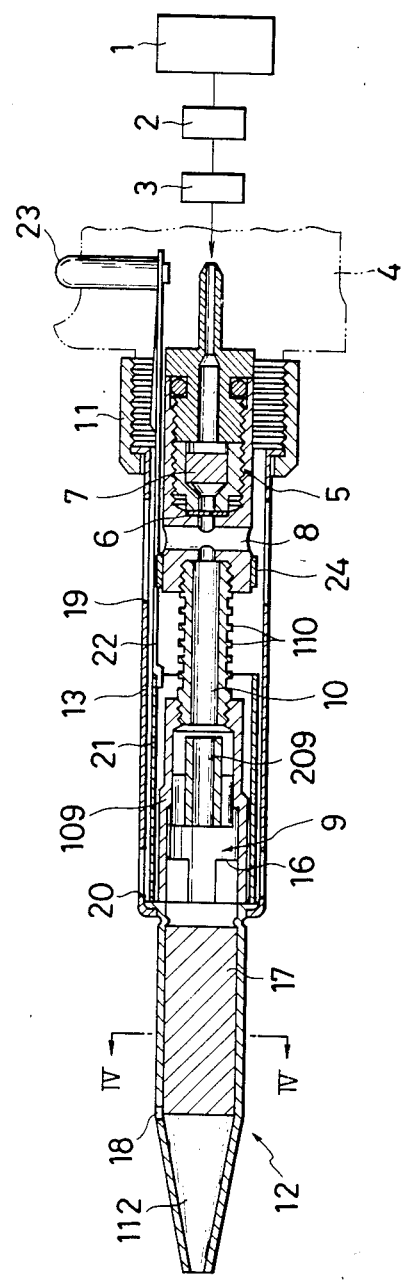

Descriptions will be made to preferred embodiments according to this invention while referring to the drawings.

FIG. 1 shows a hot blow processing device using a liquefied gas used for soldering, fusing and melting synthetic resins, as well as for coating, drying or heating synthetic resin films and the likes by means of a hot blow, in which are shown a gas reservoir 1 for storing a liquefied gas as a fuel gas, a flow control valve 2 and an ON-OFF valve 3 which are assembled usually in a grip 4. At the top end of the grip 4, there is incorporated a cylindrical gas mixture generating member 5 for mixing a fuel gas discharged from the ON-OFF valve 3 and air to form a gas mixture. The top end of the gas mixture generating member 5 is protruded from the grip 4.

Also as shown in FIG. 1, the gas mixture generating member 5 has a disk-like nozzle plate 6 with a diameter of about 500–100 $\mu$m, preferably, about 80–90 $\mu$m and perforated at the center thereof with a nozzle aperture of a high circularity and a filter member 7 composed of a sintered porous alloy, etc. of about 12 $\mu$m particle size.

An external air intake port 8 is perforated through the gas mixture generating member 5 at the exit of the nozzle plate 6 for sucking external air under the ejector effect of the fuel gas jetted out of the nozzle plate 6 to form a gas mixture. A connection pipe 10 is screw-coupled at its base end to the the axial center at the top end of the gas mixture generating member 5 and a fire nozzle member 9 is screw-coupled to the top end of the pipe 10, such that the illustrated device may also be used as a blow or torch lamp by slakening an engaging nut 11 threaded over the outer surface at the the top end of the grip 4 thereby detaching an iron tip member 12 and a support pipe 13 as described later.

Figure 2:
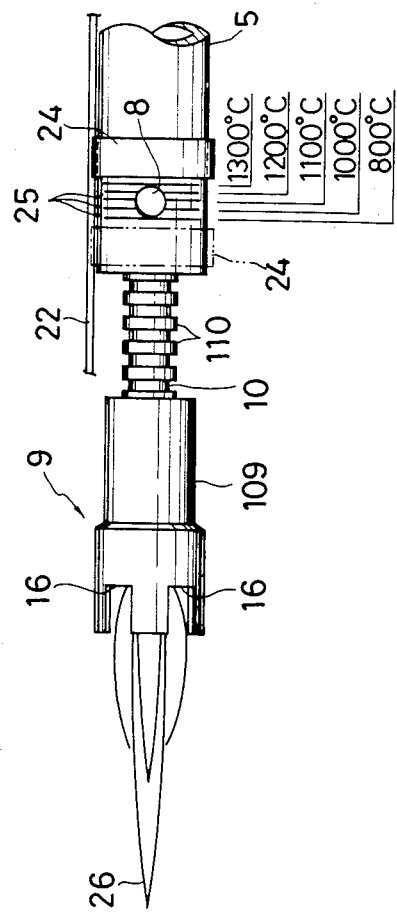

As shown in FIG. 1 and, more clearly, in FIG. 2, the connection pipe 10 is composed of a relatively long tubular member made of stainless steel or the like and having heat dissipation fins 110 at the outer surface. A gas mixture formed in the gas mixture generating member 5 is uniformly mixed during passage through the connection pipe 10 and, thereafter, introduced to the fire nozzle member 9.

Figure 3:
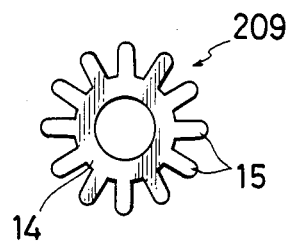

As shown in FIG. 1, the fire nozzle member 9 comprises an outer fire nozzle cylinder 109 screw-coupled to the top end of the connection pipe 10 and a fire nozzle 209 inserted fixedly to the inside of the outer fire nozzle cylinder 109. The top end of the fire nozzle 209 is protruded into the inner bore of a larger diameter at the top end of the outer fire nozzle cylinder 109. The fire nozzle 209 comprises, as shown in FIGS. 1 and 3, a hollow cylindrical portion 14 and a gear-like portion 15 formed integrally to the outer circumferential surface of the cylindrical portion 14, so that the gas mixture supplied to the fire nozzle member 9 is partially jetted through the inside of the cylindrical portion 14, while partially jetted out between each of the teeth of the gear-like portion 15, by which a stabilized gas jet can be obtained at the downstream of the fire nozzle member 9.

As shown in FIGS. 1 and 2, a plurality of recesses 16 are formed at the end of the circumferential surface of the outer fire nozzle cylinder 109 so as to communicate the inner plenum of the outer fire nozzle cylinder 109 with the external atmosphere. The gas mixture jetted out from the fire nozzle member 9 can be ignited through each of the recesses 16 from the outside.

While on the other hand, the iron tip member 12 is formed into a cylindrical shape having a tapered hot blow discharge portion 112 formed at its top end for discharging the combustion exhaust as a hot blow. A combustion catalyst 17 for the complete combustion of the gas mixture supplied from the fire nozzle member 9 is integrally incorporated to the inside of the tip member 12. Further, a window 18 capable of visually observing the color at the top end of the combustion catalyst 17 from the outside during combustion is disposed to the circumferential surface at the base end of the hot blow discharge portion 112 as shown in FIG. 1.

The iron tip member 12 having thus been constituted is engaged at its base end to the inside at the top end of the support pipe 13 and connected detacheably to the pipe 13 while being prevented from slipping off toward the top end. In the usual state, that is, where the engaging nut 11 is tightly clamped, the base end face of the tip member 12 is positioned fixedly to the surface at the top end of the outer fire nozzle cylinder 109 in a tightly secured manner.

Figure 4:
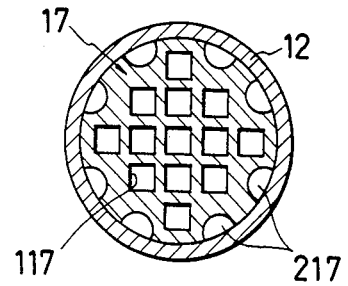

As shown in FIG. 1 and, particularly, in FIG. 4, the combustion catalyst 17 comprises a catalyst support made of ceramics in a solid cylindrical shape having a plurality of through holes 117 and U-shaped grooves 217 formed in the inside and at the circumferential surface thereof respectively and a catalyst component composed of platinum and rhodium carried at the surface of the catalyst support, so that axial linear gas flow channels are formed to the combustion catalyst 17 by means of the through holes 117 and the U-shaped grooves 217 to continue flameless combustion.

As shown in FIG. 1, the support pipe 13 made of corrosion-resistant metal material such as stainless steel has air ports 19 corresponded to the external air intake ports 8 and ignition ports 20 corresponded to the recesses 16 formed respectively at the circumferential surface thereof.

As shown in FIG. 1, a shutter member 21 is incorporated axially slidably between the support pipe 13 and the fire nozzle member 9 so as to close the ignition ports 20 and the recesses 16 for extinguishing the combustion flame once after the gas mixture from the fire nozzle member 9 has been ingited by way of the ignition ports 20 of the support pipe 13 and the recesses 16 of the outer fire nozzle cylinder 109. The shutter member 21 is adapted to be operated on the grip 4 by way of an actuation lever 22 and an actuation button 23.

Furthermore, as shown in FIGS. 1 and 2, a ring-like air flow control member 24 is incorporated axially slidably between the support pipe 13 and the gas mixture generating member 5, and the air flow control member 24 is connected to the actuation lever 22. The air flow control member 24 is actuated interlocking with the shutter member 21 by the operation to the actuation button 23, so that the external air intake port 8 in the gas mixture generating member 5 is displaced from the fully opened state to the fully closed state to thereby adjust the air intake area, by which the flow rate of the air entering the gas mixture generating member 5 is controlled.

Specifically, at the fully opened position of the shutter member 21, the air flow control member 24 is situated at a position aparted from the external air intake port 8 to render the external air intake port 8 fully open as shown by the solid line in FIG. 2. Then, as the shutter member 21 is displaced toward the closing direction, the external air intake port 8 is gradually closed from its base end (right side in the drawing) along the axial direction by the air flow control member 24, till the external air intake port 8 is completely closed by the air flow control member 24. Then, when the shutter member 21 is further actuated toward the closing side, the air flow control member 24 is gradually displaced in the direction of opening the external air intake port 8 from its base end in the axial direction. When the shutter member 21 is displaced to the completely closed state, the air flow control member 24 is completely aparted from the position of the external air intake port 8 to render the external intake port 8 fully open. In other words, the air flow control member 24 is adapted such that it completely opens the external air intake port 8 once after the port 8 has been completely closed from its completely open state during the continuous closing operation of the shutter member 21.

As shown in FIG. 2, position guide member composed of a plurality of graduations 25 indicating the temperature from 800° C. to 1300° C. is formed to the outer circumferential surface of the gas mixture generating member 5, along which the air control member 24 is caused to slide. Thus, the temperature at the top end of a flame 26 obtained from the fire nozzle member 9 is controlled to a temperature indicated by each of graduations 25 by adjusting the open area of the external air intake port 8 while aligning the axial top end, that is, the left end edge of the air flow control member 24 to the graduation.

OPERATION

When using the device of this embodiment as a soldering iron, the device is at first assembled as shown in FIG. 1 and, thereafter, the actuation button 23 is operated to render the shutter member 21 fully open. Then, the air flow control member 24, which interlocks by way of the actuation lever 22 with the shutter member 21, is actuated simultaneously to render the external air intake port 8 to a fully opened position as shown by the solid line in FIG. 2. In this state, since the shutter member 21 is fully opened, the inner space in the outer fire nozzle cylinder 109 of the fire nozzle member 9 is in communication with the external atmosphere through the recesses 16 and the ignition ports 20.

When the ON-OFF valve 3 is opened under this state, the fuel gas at a flow rate set by the flow control valve 2 is discharged from the gas reservoir 1 and mixed with air entering from the outside through the external air intake port 8 in the gas mixture generating member 5 to form a gas mixture. Then, the gas mixture is uniformly mixed during passage through the inside of the connection pipe 10 and then jetted out from the fire nozzle member 9.

Then the gas mixture is ignited through the ignition ports 20 and the recesses 16 by using a lighter or like other ignition means from the ouside. Then, flaming combustion is taken place at the fire nozzle member 9 and the combustion catalyst 17 disposed in the iron tip member 12 situated near the top end of the fire nozzle member 9 is heated by the heat of the flame to an oxidizing reaction temperature within 1-2 seconds after the ignition.

When the combustion catalyst 17 starts the oxidizing reaction, the shutter member 21 is fully closed to shut the internal plenum of the outer fire nozzle cylinder 109 from the outside. Then, the flame at the fire nozzle member 9 is extinguished and the raw gas mixture is jetted as it is directly from the fire nozzle member 9 to the combustion catalyst 17. In this case, since the temperature of the combustion catalyst 17 has been increased to the oxidizing reaction temperature, the gas mixture is put to flameless complete combustion while being brought into a sufficient contact with the catalyst component during the passage through the through holes 117 and the U-shaped grooves 217 of the combustion catalyst 17. Since the combustion catalyst 17 is then kept at the oxidizing reaction temperature by its combustion heat, the flameless combustion is continued thereafter. Then, the combustion exhaust is discharged as a hot blow from the top end of the hot blow discharge portion 112. The temperature of the hot blow can also be judged by visually observing the color at the top end of the combustion catalyst 17 through the window 18 formed at the base end of the hot blow discharge port 112, although this is merely a convenient and rough measure.

By the way, in the case where it is necessary to increase the thermal power of the iron tip member 12, it is required to increase the size of the iron tip member 12, as well as to enlarge the fire nozzle member 9 and the gas mixture generating member 5 so as to supply a large volume of the gas mixture to the combustion catalyst 17.

If the size of the device is so enlarged, the flow rate of the fuel gas from the gas reservoir 1 is increased and, accompanying therewith, the flow rate of air entering through the external air intake port 8 is also increased and the inner space of the outer fire nozzle cylinder 109 is increased as well. This may possibly result in a disadvantage that the flame at the fire nozzle member 9 would not be extinguished with ease even after the shutter member 21 has fully been closed. Particularly, if no complete shieldings can be attained sufficiently between the inner space of the outer fire nozzle cylinder 109 and the external atmosphere by some or other reasons even after the shutter member 21 has fully been closed, there is a risk that the flame is not extinguished at all.

In view of the above in this embodiment, the air flow control member 24 is connected to the actuation lever 22 so as to be interlocked with the shutter member 21 and so that the external air intake port 8 in the fully opened state is once closed fully by the air flow control member 24 and then opened fully again during the continuous closing operation of the shutter member 21. This can temporarily result in a condition where the oxygen (air) content in the gas mixture is insufficient to burn the flame at the fire nozzle member 9 thereby extinguish the flame rapidly and reliably even in a case where the scale of the device is enlarged and no sufficient shielding can be attained between the inner space of the outer fire nozzle cylinder 109 and the external atmosphere.

In the case of merely extinguishing the flame at the fire nozzle member 9, the external air intake port 8 has only to be closed fully by the air flow control member 24 with no requirement for the re-opening while leaving the shutter member 21 fully open.

However, if the external air intake port 8 is kept as it is while being fully closed by the air flow control member 24, the oxygen lacks completely in the gas mixture during the combustion of the combustion catalyst 17, in which no flameless complete combustion can be expected. Further, if the shutter member 21 is left fully opened, external air intrudes through the ignition ports 20 and the recesses 16 to the inside of the iron tip member 12 to undesirably lower the temperature of the hot blow discharged from the hot blow discharge portion 112.

In another application of using the device as a blow lamp or torch, the engaging nut 11 is at first slackened to detach the iron tip member 12 and the support pipe 13 as shown in FIG. 2. Then, the actuation button 23 is operated causing the shutter member 21 to slide till the fully open position. Although the ON-OFF position of the shutter member 21 itself has no particular concerns in the case of using the device as the blow lamp or torch, when the shutter member 21 is caused to slide till the fully opened state, the air flow control member 24 is also caused to slide interlockingly to render the external air intake port 8 fully open as shown in FIG. 2.

When the ON-OFF valve 3 is opened under this state, the fuel gas at a flow rate set by the flow control valve 2 is discharged from the gas reservoir 1 and mixed with air entering from the external air intake port 8 in the gas mixture generating member 5 to form a gas mixture. The gas mixture is then jetted out though the connection pipe 10 from the fire nozzle member 9.

Then, when the gas mixture is ignited by using a lighter or like other ignition means, a flame 26 as shown in FIG. 2 is obtained. Since the external air intake port 8 is fully opened and a sufficient amount of air is mixed into the gas mixture, the temperature at the top end of the flame 26 reaches, for instance, as high as 1300° C.

However, the temperature of 1300° C. may be too high depending on the kinds of the works to be processed thermally. In such a case, the air flow control member 24 is caused to slide thereby decreasing the open area of the external air intake port 8. Then, the flow rate of the inflow air is reduced as the open area for the external intake port 8 is decreased and the temperature at the top end of the flame 26 is gradually lowered such as to 1200° C., 1100° C., 1000° C., etc. by aligning the corresponding sliding position of the air flow control member 24 with each of the graduations 25. Then, when the external intake port 8 is fully closed by the air flow control member 24, the fuel gas from the gas reservoir 1 is jetted solely as it is from the fire nozzle member 9, in which the temperature at the top end of the flame 26 is lowered to 800° C. just like that of a gas lighter flame and the device can be used as a torch lamp.

In this case, different from the case for use in the soldering iron as described above, the flame 26 is not extinguished even if the external air intake port 8 is fully closed.

By the way, the temperature at the top end of the flame 26 may also be controlled as usual by regulating the gas flow rate by the flow control valve 2. However, the flame length significantly fluctuates in this method to worsen the workability and brings about a difficulty in the temperature control.

On the contrary, in the method of adjusting the open area of the external intake port 8 by the flow control member 24, the temperature at the top end of the flame 26 can exactly be adjusted without changing the length of the flame 26 and the processing operation is facilitated. Furthermore, by aligning the reference position of the air flow control member 24 with the temperature graduation, desired and accurate temperature control is enabled with ease.

Figure 5:
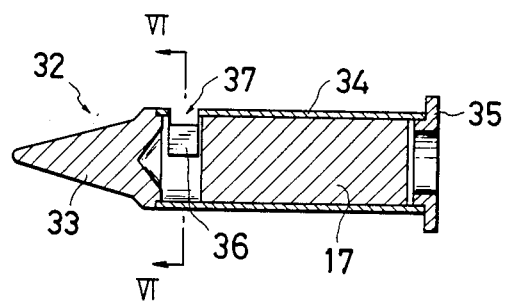
Figure 6:
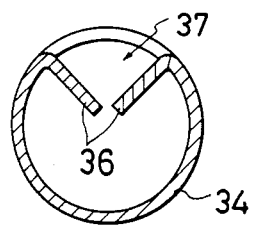

FIGS. 5 and 6 show a further embodiment of this invention, in which the iron tip member 12 in the previous embodiment, that is, a so-called contactless soldering iron of a type that discharges the combustion exhaust as a hot blow is replaced with a soldering iron tip member 32 of a so-called contact type soldering iron in which the iron tip is heated by the combustion heat.

As shown in FIG. 5, the iron tip member 32 has a pipe 34 made, e.g., of stainless steel having a tip member 33 secured at the top end thereof, which is heated by the combustion heat. A combustion catalyst 17 is disposed to the inside of the pipe 34 and a flange member 35 is secured to the base end of the pipe 34 for preventing the combustion catalyst 17 from slipping out of the pipe 34 and for preventing the iron tip member 32 from slipping out of the support pipe 13. As shown in FIGS. 5 and 6, a pair of bent pieces 36, 36 circumferentially opposed with each other are formed by way of forging, etc. and the port formed by turning back the bent pieces 36, 36 constitutes a combustion discharge port 37. Each of the bent pieces 36 has a function of decreasing the velocity of the combustion exhaust discharged from the combustion discharge port 37 thereby preventing accidental burning injuries caused by the combustion exhaust and also a function of securing the combustion catalyst 17 in the pipe 34 with relation to the flange member 35. In this embodiment, the constitutions and the functions other than those just described above are quite identical with those of the previous embodiments and detailed descriptions therefor are omitted.

By using the iron tip member 32, the device can also be applied to the contact type soldering iron with the similar effects.

Although the explanations have been made to both of the embodiments in which the shutter member 21 is interlocked with the air flow control member 24, it may be so constituted that they are operated independently, or the shutter member 21 may be saved by enabling the iron tip member 12 and the fire nozzle member 9 to be brought closer to or aparting from each other thereby opening or closing the space between them.

Further, although explanations have been made to both of the embodiments in which the air flow control member 24 is caused to slide axially, the member may be adapted to rotate circumferentially to adjust the open area of the external air intake port 8.

Furthermore, while the explanations have been made to both of the embodiments for the device capable of serving both as the hot soldering iron and blow or torch lamp, this invention is, of course, applicable exclusively to the soldering iron, blow or torch lamp.

As has been described above according to this invention, since the open area for the external air intake port of the gas mixture generating member is adjusted by the air flow control member to thereby control the flow rate of the air flowing into the gas mixture generating member, the temperature at the top end of the flame can be adjusted easily and exactly without changing the flame length upon using the device as a blow lamp and the device can also be used as a torch by fully closing the external air intake port.

Further, in another invention of the present application, since the external air intake port under the fully open state is once closed completely and then opened fully again by the operation to the air flow control member interlocked with the shutter member, the flame at the fire nozzle member can be extinguished rapidly and reliably under any condition when used as a soldering iron.

What is claimed is:

1. A heat processing device using a liquefied gas from a gas reservoir comprising:
   a nozzle for jetting out liquefied gas from said gas reservoir as a fuel gas,
   a cylindrical gas mixture generating means disposed at the exit of said nozzle and supplied with the fuel gas jetted out from said nozzle for mixing said fuel gas with atmospheric air, said generating means having a circumferential wall in which an air intake port is defined for sucking external air under the ejector effect of the fuel gas jetted out of said nozzle to form a gas mixture,
   a fire nozzle means for jetting out the gas mixture supplied from said gas generating means to cause flaming combustion to take place, means connecting said gas mixture generating means to said fire nozzle means,
   an iron tip member disposed on an outlet of the fire nozzle means and having incorporated therein a combustion catalyst for the complete combustion of the gas mixture by an oxidizing reaction, and
   an air flow control member slidably mounted about the outer circumference of said gas mixture generating means so as to be locatable to the following regions (a)–(c) successively in relation with said external air intake port of said gas mixture generating means:
   (a) a first region for fully opening said air intake port in order to attain flaming combustion before starting the complete catalytic combustion of the gas mixture jetted out from said fire nozzle member;
   (b) a second region for fully closing said air intake port after the complete catalytic combustion has been started; for rapidly and reliably extinguishing the flaming combustion of the gas mixture jetted out from said fire nozzle member, and;
   (c) a third region for gradually opening said air intake port that had been closed fully for continuing the complete catalytic combustion at a temperature varying depending on the opening area of said air intake port.

2. A heat processing device using a liquefied gas as defined in claim 1, wherein the iron tip member is made detacheable.

3. A heat processing device using a liquefied gas as defined in claim 1, further comprising a support pipe surrounding said fire nozzle member and connected to said iron tip member, said support pipe having an opening adjacent said fire nozzle member, a shutter member disposed between the fire nozzle member and the support pipe for connecting or disconnecting said opening in said support pipe with the external atmosphere, and wherein the operation of the shutter member is interlocked with the operations for the external air intake port by the air flow control member.

4. A heat processing device according to claim 1, wherein said connection means has a passage therein whereby said gas mixture is transported from said cylindrical means to said fire nozzle means.

5. A heat processing device according to claim 4 wherein said connecting means is provided with plurality of heat dissipation fins thereon.

* * * * *